Sept. 17, 1963 P. C. ARCHIBALD ETAL 3,104,148
ELECTRONIC STROBING SYSTEM FOR OBSERVING REPETITIVE, HIGH
SPEED, OPTICAL PHENOMENA
Filed May 26, 1961
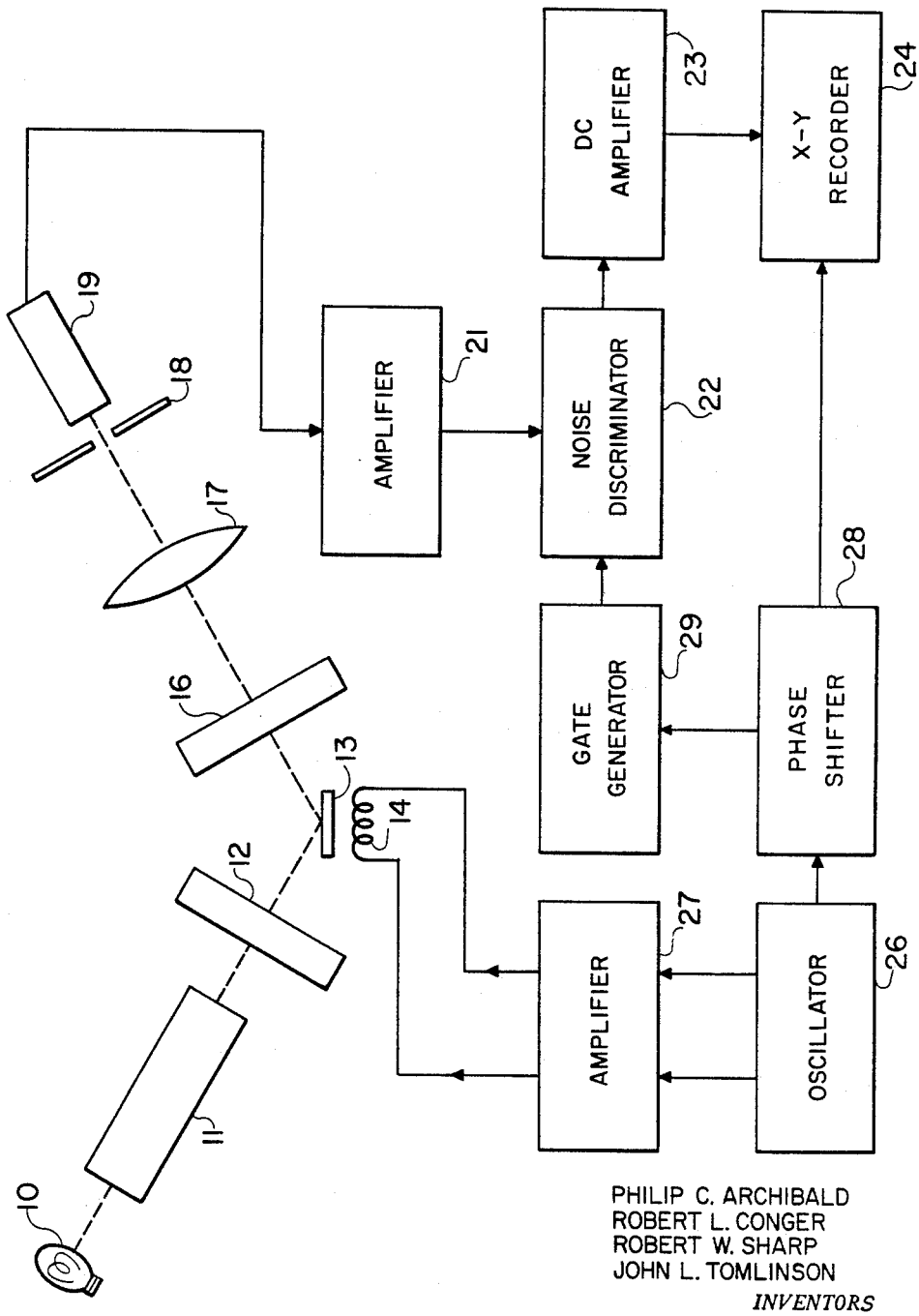
PHILIP C. ARCHIBALD
ROBERT L. CONGER
ROBERT W. SHARP
JOHN L. TOMLINSON
*INVENTORS*
BY *F. M. Phillips*
*J. M. St. Amand*
ATTORNEYS 3,104,148
ELECTRONIC STROBING SYSTEM FOR OBSERVING REPETITIVE, HIGH SPEED, OPTICAL PHENOMENA
Philip C. Archibald, Robert L. Conger, Robert W. Sharp, and John L. Tomlinson, all of Riverside, Calif., assignors to the United States of America as represented by the Secretary of the Navy
Filed May 26, 1961, Ser. No. 113,044
1 Claim. (Cl. 346—33)
(Granted under Title 35, U.S. Code (1952), sec. 266)

The invention herein described may be manufactured and used by or for the Government of the United States of America for governmental purposes without the payment of any royalties thereon or therefor.

The present invention relates to an electronic strobing system and more particularly to an electronic strobing system for observing the progression of an optical phenomenon taking place at an extremely high rate of repetition.

In known systems, high speed photographic techniques consisting of a sequence of exposures during a single cycle of the phenomenon require an extremely intense light source. In certain applications, which require the use of nearly crossed polarizers to observe the phenomenon, light sources, with sufficient light intensity are not available.

Accordingly, an object of the present invention is to provide an electronic strobing system which will enable the observation of the progression of an optical phenomenon taking place at an extremely high rate of repetition.

Another object is to provide a system for the observation of the progression of an optical phenomenon taking place at an extremely high rate of repetition where intense light sources are not available.

Other objects and many of the attendant advantages of this invention will be readily appreciated as the same becomes better understood by reference to the following detailed description when considered in connection with the accompanying drawings wherein:

There is shown in the single FIGURE a schematic diagram of a strobing system embodying the invention.

Referring now to the drawings, there is shown a light source 10 which may be the light from a standard projection lamp. The light from light source 10 is fed through collimator 11, a polarizer 12 to a thin film of a magnetic metal 13 which reflects the light through analyzer 16 (adjusted to produce maximum contrast). Film 13 is placed on a spiral driving coil 14 which produces a uniform field at the film and does not interfere with the optics. The Kerr effect causes the polarization angle of the light to be altered by the magnetization of the different portions of the film 13. The output of oscillator 26 amplified by amplifier 27 provides the magnetic field for driving the magnetic domain in film 13.

The image of the film domain pattern is brought to focus by lens 17 on the surface of a mask 18 with a small aperture placed in front of a photomultiplier tube 19. The output of photomultiplier tube 19 of any well known type is amplified in amplifier 21 and fed into noise discriminator 22 which is of the same type and operates in the same manner as that described in U.S. Patent No. 2,874,284, February 17, 1959 of R. L. Conger. Also coupled as an input to noise discriminator 22 is gate generator 29 which is controlled by a trigger input from oscillator 26 coupled through phase shifter 28. The integrated output of discriminator 22 is coupled to an $x$—$y$ recorder 24 through a D.C. amplifier 23.

In operation, the amplified signal from tube 19 is sampled by means of a gate generated by gate generator 29 at the same time during each cycle. The gate generated is made very narrow in width as compared to a complete cycle of the phenomenon. The sampling is done for a number of cycles appropriate for reducing noise from the signal or system.

To control the sampling time, phase shifter 28 is used to vary the phase between the signal from photo tube 19 and the sampling gate from generator 29. Phase shifter 28 acts as a variable time delay between the beginning of the signal cycle and the gate and, also, drives the X-axis of recorder 24. By continuously varying the phase between the gate and the signal cycle, and plotting them on recorder 24, a curve for one complete cycle is obtained for that section of the phenomenon under observation. The aperture in mask 18 should be very small in order to allow only a small section of the phenomenon to be observed at one time. By plotting a curve for each small section of the entire phenomenon, all necessary data are obtained to reconstruct a picture of the phenomenon at any desired time during the cycle.

Obviously many modifications and variations of the present invention are possible in the light of the above teachings. It is therefore to be understood that within the scope of the appended claim the invention may be practiced otherwise than as specifically described.

What is claimed is:

In an electronic strobing system for observing the progression of an optical phenomenon taking place at an extremely high rate of repetition, the combination comprising:

(a) photoelectric detecting means for detecting said optical phenomenon and generating an output signal voltage in response thereto, (b) sampling means for sampling said output signal voltage at the same time each cycle for a plurality of cycles, (c) circuit means coupled to said photoelectric detecting means and to said sampling means for averaging the amplitudes of the sampled portion of said signal voltage, (d) an $x$—$y$ recorder having said averaged signal coupled thereto as the input drive to the $y$-axes, (e) a phase shifter coupled to said sampling means and to said $x$—$y$ recorder for respectively varying the time during each cycle a sample is taken and to provide the drive to the $x$-axis of said recorder.

References Cited in the file of this patent
UNITED STATES PATENTS
2,925,309    Cox et al. _____ Feb. 16, 1960

OTHER REFERENCES
Fowler et al.: Phys. Rev., vol. 94, pages 52–56, (5 pages), 1954.